(12) United States Patent
Yeh

(10) Patent No.: US 7,408,266 B2
(45) Date of Patent: Aug. 5, 2008

(54) SHOCK-ABSORBABLE ELECTRICITY-PRODUCING APPARATUS

(76) Inventor: Ming-Hsiang Yeh, 14F, No. 375, Nan-Gang District, Fu De Street, Taipei City (TW)

( * ) Notice: Subject to any disclaimer, the term of this patent is extended or adjusted under 35 U.S.C. 154(b) by 415 days.

(21) Appl. No.: 11/256,110

(22) Filed: Oct. 24, 2005

(65) Prior Publication Data

US 2007/0090703 A1    Apr. 26, 2007

(51) Int. Cl.
*H02P 9/00*    (2006.01)
(52) U.S. Cl. ............... 290/1 C; 290/1 A; 290/1 E; 322/1
(58) Field of Classification Search ............. 290/1 R, 290/1 A, 1 C, 1 D, 45; 322/1; 180/205
See application file for complete search history.

(56) References Cited

U.S. PATENT DOCUMENTS

| | | | | |
|---|---|---|---|---|
| 3,573,479 A | * | 4/1971 | Rieth | 290/1 E |
| 3,981,204 A | * | 9/1976 | Starbard | 74/34 |
| 4,032,829 A | * | 6/1977 | Schenavar | 322/3 |
| 4,078,438 A | * | 3/1978 | Starbard | 74/34 |
| 4,387,781 A | * | 6/1983 | Ezell et al. | 180/65.3 |
| 5,259,259 A | * | 11/1993 | Inokuchi et al. | 74/131 |
| 6,703,716 B2 | * | 3/2004 | Chiu | 290/1 R |
| 7,304,398 B1 | * | 12/2007 | Kim et al. | 290/1 E |

\* cited by examiner

*Primary Examiner*—Nicholas Ponomarenko
(74) *Attorney, Agent, or Firm*—Apex Juns, pllc; Tracy M Heims

(57) ABSTRACT

A shock-absorbable electricity-producing apparatus comprises an electricity generator and an electricity-producing module. The electricity-producing module includes a rack, first and second gears, and a spring buffer. The rack is synchronously driven by a shock absorber. The spring buffer is located between the first and second gears. The first and second gears are engaged with the rack and an axial gear of the electricity generator, respectively. An electricity output terminal of the electricity generator is connected to an electric device. As a result, the rack drives the first gear by means of gravity drop that forms during movement of the shock absorber to enable the electricity generator to produce electricity. Consequently, the shock-absorbable electricity-producing apparatus absorbs shocks and produces the electricity insensibly without causing burden and resistance.

9 Claims, 5 Drawing Sheets

SHOCK-ABSORBABLE ELECTRICITY-PRODUCING APPARATUS

FIELD OF THE INVENTION

The present invention relates a shock-absorbable electricity-producing apparatus that utilizes difference in ground height to produce electric power.

BACKGROUND OF THE INVENTION

Up to now, transportation means have included automobiles, motorcycles, bicycles, etc. The automobiles and motorcycles have equipped with built-in storage batteries while the bicycles haven't equipped with built-in power systems yet. Generally speaking, only the manpower can drive the bicycles. The riders are safe from danger in the daytime, but they are not safe from danger in the nighttime because of poor visibility.

For the purpose of protecting the riders from harm, several light-reflecting belts and twinkle lights have been mounted on chair cushions or wheels of commercial bicycles to notify automobile and motorcycle drivers of the existence of riders. Besides, in order to light up the twinkle lights that mount on the bicycles, the bicycles must be provided with batteries or electricity-producing machines such as those disclosed in Taiwan Patent No. 533,145, entitled "A bicycle hub having an electricity generator", and Taiwan Patent No. 514,030, entitled "A reparable hub". Although these conventional structures enable the bicycles to supply electric power for the twinkle lights by themselves, they are very complex and have high processing and component costs since it is not easy to assemble these structures. Furthermore, the operation of these conventional structures is laborious and the conventional electricity generators will not work until the bicycles reaches specific speeds.

In view of the above-mentioned conventional deficiencies, the present inventor makes a diligent study to provide consumers with a shock-absorbable electricity-producing apparatus that utilizes difference in ground height to produce electric power without causing burden and resistance in accordance with the motive of the present invention.

SUMMARY OF THE INVENTION

It is a main objective of the present invention to provide a shock-absorbable electricity-producing apparatus that utilizes difference in ground height to produce electric power.

It is another objective of the present invention to provide a shock-absorbable electricity-producing apparatus that absorbs shocks caused by difference in ground height and that produces electric power insensibly without causing burden and resistance.

In order to achieve the aforementioned objectives, a shock-absorbable electricity-producing apparatus comprises an electricity generator and an electricity-producing module. The electricity-producing module includes a rack, first and second gears, and a spring buffer. The rack is synchronously driven by a shock absorber. The spring buffer is located between the first and second gears. The first and second gears are engaged with the rack and an axial gear of the electricity generator, respectively. An electricity output terminal of the electricity generator is connected to an electric device. As a result, the rack drives the first gear by means of gravity drop that forms during movement of the shock absorber to enable the electricity generator to produce electric power. Consequently, the shock-absorbable electricity-producing apparatus absorbs shocks and produces the electric power insensibly without causing burden and resistance.

The aforementioned aspects and advantages of the present invention will be readily clarified in the description of the preferred embodiments and the enclosed drawings of the present invention.

DETAILED DESCRIPTION OF THE PREFERRED EMBODIMENT

Figure 1:
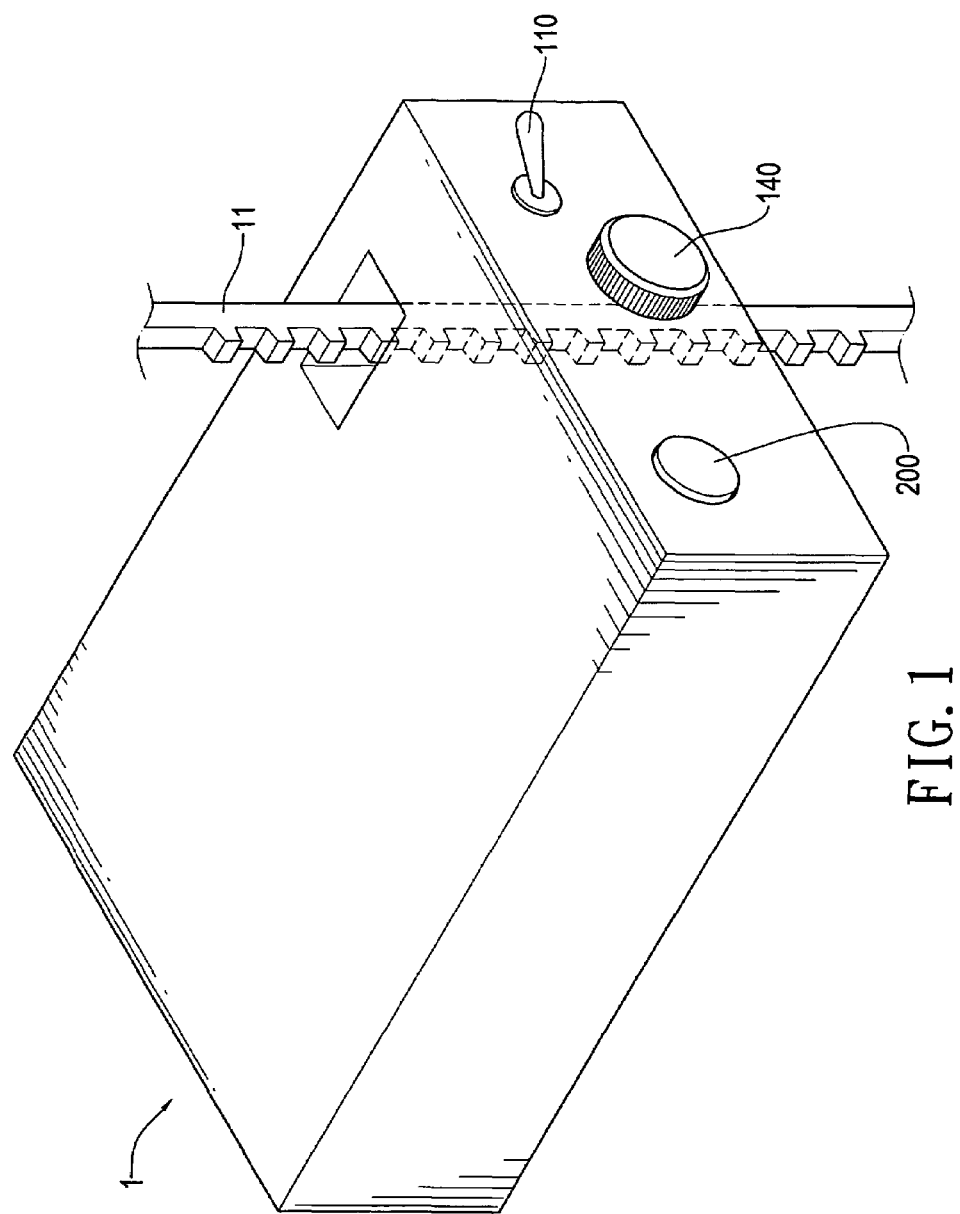
FIG. 1 is a three-dimensional view showing the structure in accordance with a first preferred embodiment of the present invention.
Figure 2:
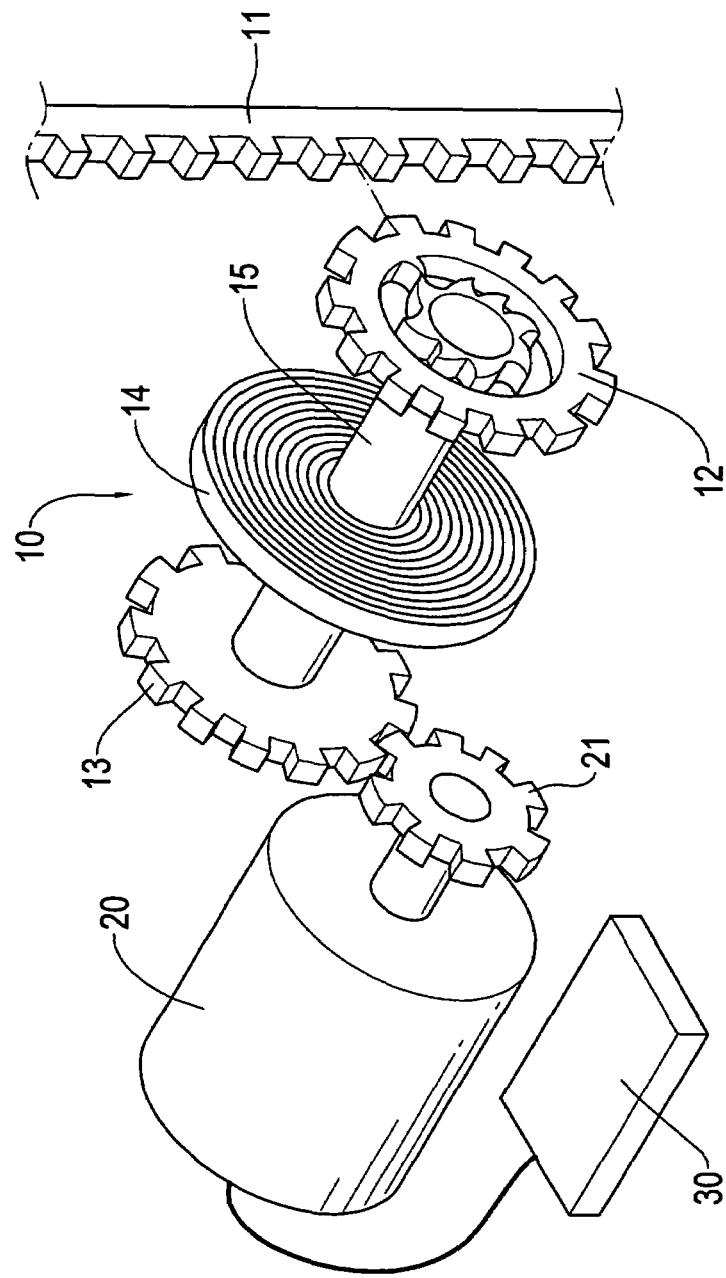
FIG. 2 is an exploded view showing the structure in accordance with the first preferred embodiment of the present invention.

Referring to FIG. 1 and FIG. 2, the present invention comprises a case 1 having an electricity-producing module 10 and an electricity generator 20 mounted therein, wherein the electricity-producing module 10 is composed of a rack 11, a one-way gear 12, a spring buffer 14, a gear 13, and a shaft 15. The shaft 15 is mounted to insert through the spring buffer 14. Moreover, the one-way gear 12 is axially coupled to one end of the shaft 15, and the gear 13 is axially coupled to the other end of the shaft 15. In addition, the one-way gear 12 is engaged with the rack 11.

The electricity generator 20 has a rotation shaft to which an axial gear 21 is mounted. The axial gear 21 is engaged with the gear 13 of the electricity-producing module 10 (described above).

The one-way gear 12 that engages with the rack 11 is driven when the rack 11 is shifted upward and downward. The one-way gear 12 drives the shaft 15 in a single direction. For example, it is assumed that the one-way gear 12 drives the shaft 15 when the rack 11 shifts upward. On the contrary, the one-way gear 12 is idle when the rack 11 shifts downward. In addition, the rotation of the shaft 15 enables the synchronous rotation of the gear 13 that mounts opposite to the one-way gear 12 so as to further drive the axial gear 21 that engages with the electricity generator 20, whereby the electricity generator 20 produces electric power and supplies related components with the produced electric power.

Figure 3:
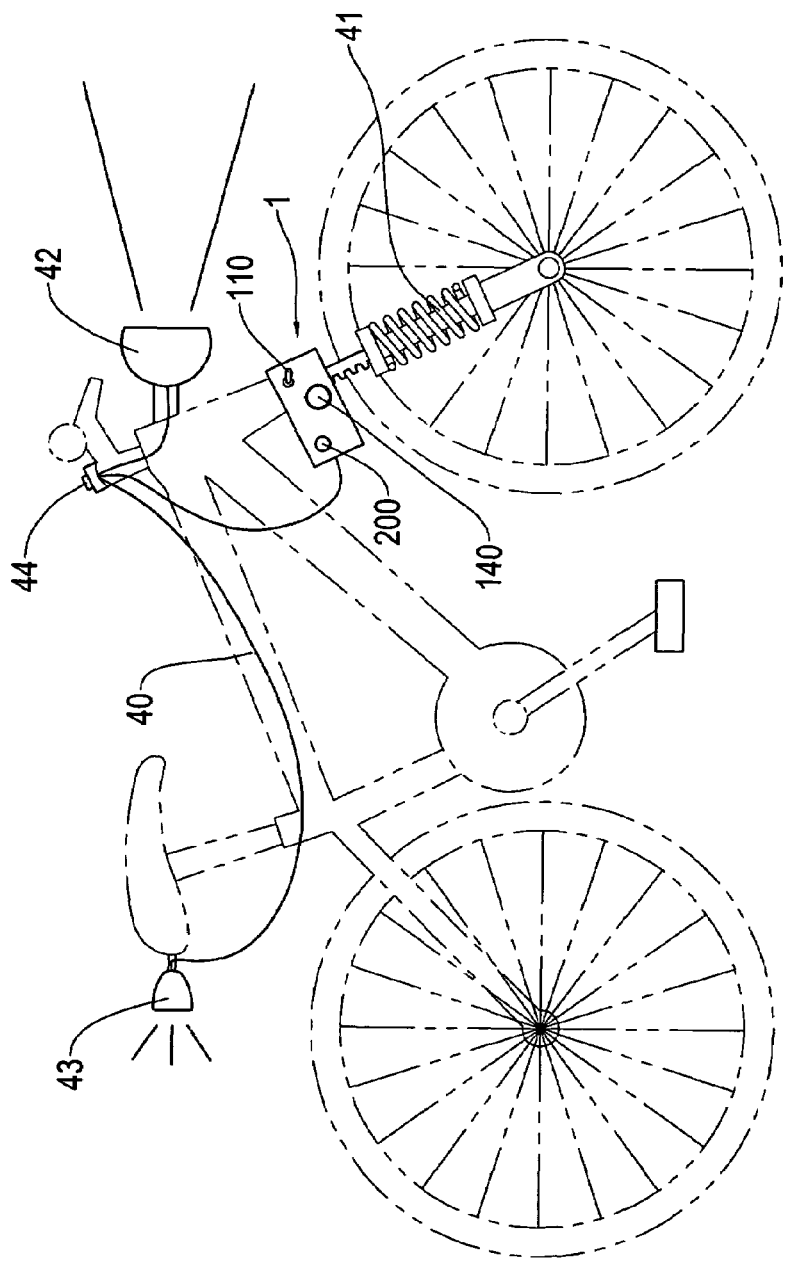
FIG. 3 is a schematic view showing that the structure of the first preferred embodiment of the present invention is applied to the bicycle.

Referring to FIG. 3, the case 1 of the present invention is coupled to a bicycle 40. The rack 11 has one end connected to a main shaft of a shock absorber 41 of the bicycle 40. An electricity storage unit 30 is further connected to an electric device such as a headlight 42 or a rear warning light 43 that mounts on the bicycle 40 via a control switch 44, whereby the rider is protected from suffering jolts by means of the shock absorber 41 that absorbs shocks when the bicycle 40 encounters a bumpy road. The shock absorber 41 absorbs and utilizes gravity drop to drive rack 11. The rack 11 synchronously drives the one-way gear 12 such that the gear 13 that mounts opposite to the one-way gear 12 can synchronously drive the axial gear 21 to enable the electricity generator 20 to produce electric power. Consequently, the purposes of illumination and warning can be achieved by merely switching on the control switch 44 so as to turn on the headlight 42 or the rear warning light 43.

Furthermore, the electricity generator 20 has an electricity output terminal connected to the electricity storage unit 30 such as a battery for storing the electric power that is produced as described above.

Alternatively, another gear on which a runout device is mounted can be utilized in place of the above-mentioned one-way gear 12. In addition, first and second racks 11 are reversely mounted on both sides of this gear, respectively, and connected to the main shaft of the shock absorber 41 simultaneously. As a result, when the shock absorber 41 absorbs shocks, the runout device enables this gear to biasedly engage with the first rack that shifts upward. When the shock absorber 41 releases, the runout device enables this gear to biasedly engage with the second rack that mounts reversely. As a result, the electricity generator 20 becomes a two-way electricity generator.

Furthermore, the spring buffer 14 that mounts between the one-way gear 12 and the gear 13 absorbs and buffers large shocks when the bicycle 40 encounters the bumpy road. Besides, the spring buffer 14 also can accumulate kinetic energy generated by small shocks such that the electricity generator 20 can obtain smooth kinetic energy.

In addition, an adjusting rod 140 for adjusting elastic strength of the spring buffer 14, a clutch rod 110 of a clutch for controlling engagement and disengagement between the rack 11 and the one-way gear 12, and a control button 200 for controlling the generation of electricity are mounted outside the case 1. Besides, an optional step-up/step-down device or an optional charger may be further connected to the electricity output terminal of the electricity generator 20.

Figure 4:
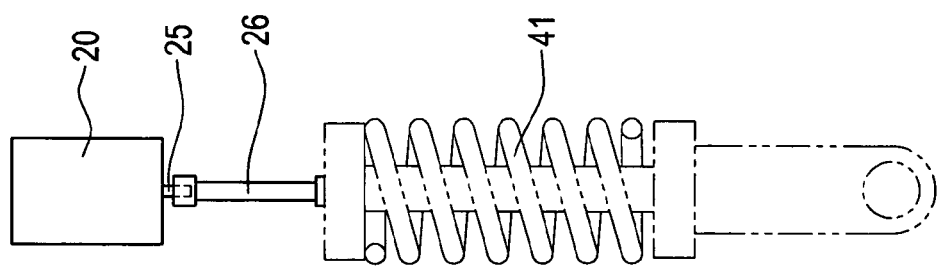
FIG. 4 is a schematic view showing the interactive connection in accordance with a second preferred embodiment of the present invention.
Figure 5:
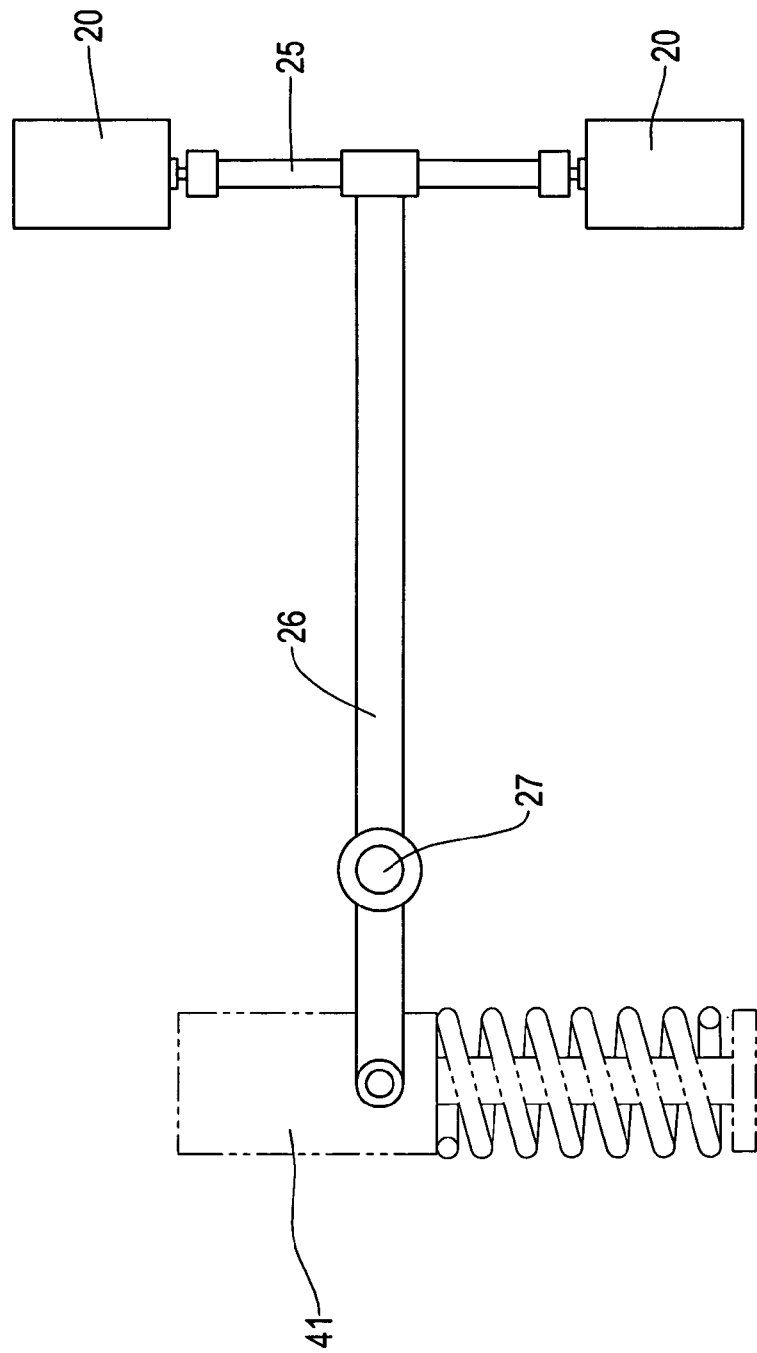
FIG. 5 is a schematic view showing another application in accordance with the second preferred embodiment of the present invention.

Moreover, the electricity generator 20 can be a linear reciprocating generator instead of the traditional rotor-type generator, wherein a reciprocating spindle 25 of the reciprocating generator 20 is coaxially connected to a connection rod 26 that further coaxially connects with the main shaft of the shock absorber 41, as shown in FIG. 4, whereby the shock absorber 41 absorbs the shocks and synchronously drives the reciprocating spindle 25 of the reciprocating generator 20 so as to produce electric power. Alternatively, the connection rod 26 can be perpendicularly connected to the shock absorber 41 and the reciprocating spindle 25, as shown in FIG. 5, and a positioning shaft 27 is mounted on the connection rod 26 near the shock absorber 4. As a result, the reciprocating spindle 25 provides larger torque than the shock absorber 41 such that the connection rod 26 can enable the reciprocating generator 20 to produce more electricity in accordance with principle of the lever. Moreover, several above-mentioned connection rods and linear reciprocating generators can be connected to the shock absorber 41 so as to produce a large amount of electricity.

According to the foregoing description, it is apparent that the apparatus of the present invention has several advantages as follows:

1. The gravity drop that forms during movement of the transportation means can be utilized to absorb shocks and produce electricity and the produced electricity can be supplied for several electric devices such that several objectives can be attained at the same time.

2. Burden and resistance caused by actuation of the conventional electricity generator can be cured effectively since the gravity drop is utilized in the present invention for producing electric power insensibly without burdening the user.

3. The structure of the present invention can be mounted under the chair cushion of the transportation means, whereby the transportation means that encounters the bumpy road absorbs shocks and produces electricity when the user is sat on the chair cushion.

In summary, the shock-absorbable electricity-producing apparatus of the present invention satisfies patentability. Accordingly, it is submitted for a patent.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments, which do not depart from the spirit and scope of the invention.

What the invention claimed is:

1. A shock-absorbable electricity-producing apparatus comprising:
   an electricity generator having an axial gear mounted thereon; and
   an electricity-producing module including a first rack, a shaft, first and second gears, and a spring buffer, the first and second gears being mounted on both ends of the shaft, respectively, the spring buffer being sleeved on the shaft between the first and second gears, the first and second gears being engaged with the first rack and the axial gear of the electricity generator, respectively, the first rack being synchronously driven by a shock absorber, whereby the first rack drives the first gear by means of gravity drop that forms during movement of the shock absorber to enable the electricity generator to produce electricity, thereby absorbing shocks and producing the electricity simultaneously.

2. The shock-absorbable electricity-producing apparatus of claim 1, wherein the electricity-producing module further comprising a clutch rod of a clutch for controlling engagement and disengagement between the first rack and the first gear.

3. The shock-absorbable electricity-producing apparatus of claim 1, wherein the first gear that engages with the first rack is a one-way gear.

4. The shock-absorbable electricity-producing apparatus of claim 1, wherein the electricity-producing module further comprises an adjusting rod for adjusting elastic strength of the spring buffer.

5. The shock-absorbable electricity-producing apparatus of claim 1, wherein the electricity generator further comprises a control button for turning on or turning off the electricity generator.

6. The shock-absorbable electricity-producing apparatus of claim 1, wherein the electricity-producing module further has a second rack and the first gear has a runout device mounted thereon to enable the first gear to biasedly engage with one of the first and second racks, whereby the electricity generator becomes a two-way electricity generator.

7. The shock-absorbable electricity-producing apparatus of claim 1, further comprising a step-up/step-down device connected to an electricity output terminal of the electricity generator.

8. The shock-absorbable electricity-producing apparatus of claim 1, further comprising a charger connected to an electricity output terminal of the electricity generator.

9. The shock-absorbable electricity-producing apparatus of claim 1, further comprising an electricity storage unit connected to an electricity output terminal of the electricity generator.

* * * * *